United States Patent [19]

Garlinger

[11] 4,162,512

[45] Jul. 24, 1979

[54] VIDEO PERIODICITY INDICATOR

[76] Inventor: Douglas W. Garlinger, 225 Highwood Dr., Westfield, Ind. 46074

[21] Appl. No.: 880,596

[22] Filed: Feb. 23, 1978

[51] Int. Cl.² ............................................. H04N 7/02
[52] U.S. Cl. ...................................... 358/139; 358/142
[58] Field of Search .............................. 358/139, 142

[56] References Cited

U.S. PATENT DOCUMENTS 4,051,532  9/1977  Hilbert et al. ........................ 358/142

Primary Examiner—Robert L. Griffin
Assistant Examiner—Edward L. Coles

[57] ABSTRACT

An electronic signal processor is provided with means of accepting a video signal and a reference signal. A periodicity indicator signal, generated from the reference signal, is incorporated into the video signal. The periodicity indicator signal is inhibited during intervals when synchronization signals are present in the video signal. The resultant video signal can be utilized in the same manner as a conventional video signal. In a second embodiment, two or more reference signals are employed to produce two or more periodicity indicator signals.

3 Claims, 9 Drawing Figures

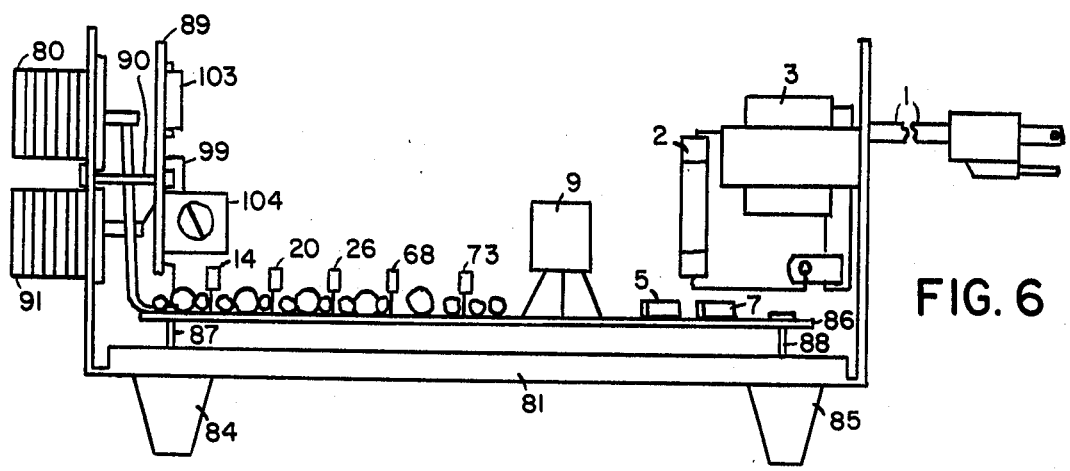
FIG. 6
FIG. 7
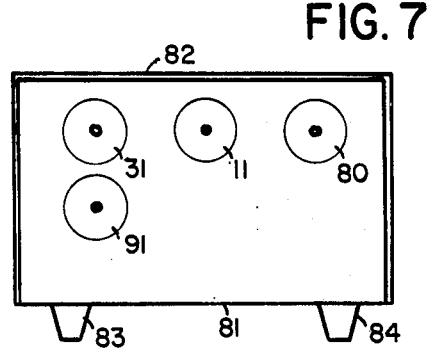
FIG. 8
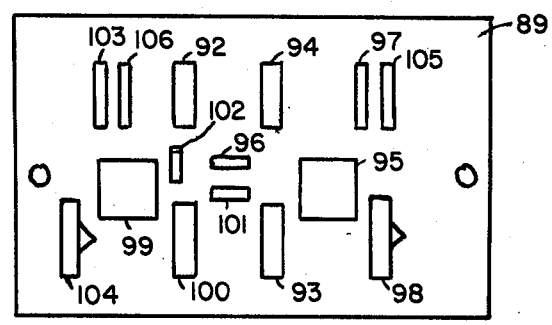
FIG. 9
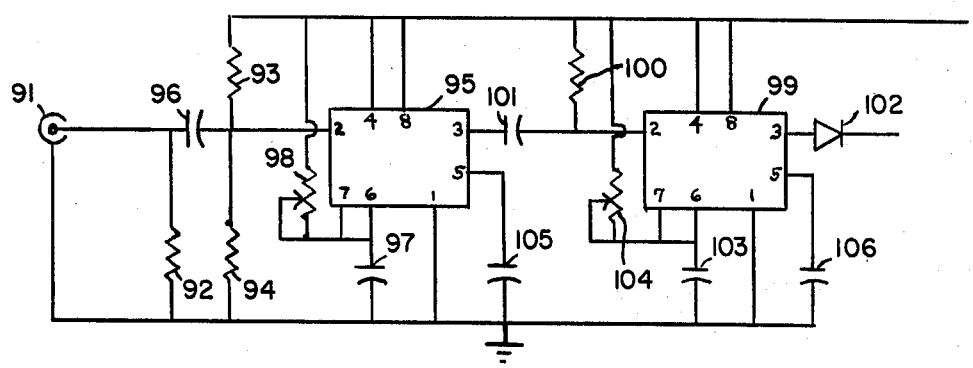

VIDEO PERIODICITY INDICATOR

The present invention relates to determining the periodicity of a video signal relative to one or more reference signals. This is accomplished by generating a periodicity indicator signal for each reference signal. The video periodicity indicator signals are incorporated into the video signal to produce a modified video signal.

Personnel involved in the production of video material often need a means of determining whether a video signal is synchronous with a particular reference signal. Observing a conventional video signal on a picture monitor is inadequate for this purpose. This is because the vertical synchronization circuits within a picture monitor are capable of quickly assuming the exact vertical frequency and vertical phase of the video signal.

Many videotape machines currently used in industry, schools and broadcasting employ a means of controlling the vertical frequency and vertical phase of the reproduced video signal relative to a reference signal. Ideally the reproduced video signal should be perfectly synchronous with the reference signal. In practice, however, it is found that the reproduced video signal may contain variations in frequency and phase from one vertical period to the next. Large variations in the periodicity of the video signal cold occur without being detectable on a picture monitor.

If the variations in the periodicity of a video signal are not too large they can be corrected by processing the video signal through a time base corrector. Access to a time base corrector to conclusively determine that a video signal is suitable for time base correction is often limited due to the considerable cost of a time base corrector. Often a great deal of time and effort are expended to produce video material, only to find out that the video material contains portions that are not suitable for time base correction and hence is unuseable for the purpose intended. This usually occurs when a picture monitor was the only means of evaluating the video signal prior to time base correction.

Overcoming these difficulties, the present invention is designed to eliminate these troublesome problems by offering a simple construction, efficient, inexpensive and practicable device for indicating the periodicity of a video signal when viewed on a conventional picture monitor. The invention is supplied with a video signal and a reference signal such as a vertical drive signal, a vertical sync signal extracted from a video signal, a servo pulse taken from a videotape machine, or any signal of suitable waveform for the invention to generate a periodicity indicator signal. The periodicity indicator signal is incorporated into the video signal within the invention. The invention has means of adjusting the time delay, duration and amplitude of the periodicity indicator signal. The amount of time delay selected determines the assigned position of the periodicity indicator signal as it appears on the picture monitor. The periodicity indicator signal is inhibited during intervals when synchronization signals are present in the video signal. This prevents the periodicity indicator signal from interfering with the synchronization signals contained in the video signal.

The principal object of this invention is to determine relative vertical frequency and vertical phase relationships between a video signal and a reference signal.

A further object of the invention is to indicate that a video signal is synchronous with the reference signal when the periodicity indicator signal appears perfectly stationary at its assigned position on the picture monitor.

Another object of the invention is to indicate that a video signal is of the same frequency as the reference signal but of different phase when the periodicity indicator signal appears perfectly stationary but not at its assigned position on the picture monitor.

A further object of the invention is to indicate that the video signal is slightly lower in frequency than the reference signal when the periodicity indicator signal appears to move upward on the picture monitor. The rate of upward motion is proportional to the difference in frequency.

Another object of the invention is to indicate that a video signal is slightly higher in frequency than the reference signal when the periodicity indicator signal appears to move downward on the picture monitor. The rate of downward motion is proportional to the difference in frequency.

A further object of the invention is to indicate that a video signal contains time base errors when the reference signal is known to be stable and the periodicity indicator signal fluctuates about its assigned position on the picture monitor. The distance and rate with which the periodicity indicator signal deviates from its assigned position is proportional to the magnitude of the time base errors contained in the video signal.

Another object of the invention is to indicate that the reference signal contains variations in its freqency and phase when the video signal is known to be stable and the periodicity indicator signal fluctuates about its assigned position on the picture monitor.

A further object of the invention is to provide personnel involved in the preparation of video material a means of determining the suitability of a video signal for time base correction. Thereby saving much time and effort when access to a time base corrector is not readily available.

A still further object of a second embodiment of the invention is to provide a means of simultaneously determining the periodicity of a video signal relative to two or more reference signals.

Other objects and advantages of the invention will become better understood hereinafter from a consideration of the specification with reference to the accompanying drawings forming part thereof, and in which like numerals correspond to like parts throughout the several views of the invention and wherein:

FIG. 6 is a side view of a modified embodiment of the invention shown with the upper enclosure removed.

FIG. 7 is a front view of a modified embodiment of the invention.

FIG. 8 is a top view of the additional printed circuit board contained in the modified embodiment of the invention, and FIG. 9 is a schematic representation of the additional printed circuit board shown in FIG. 8.

Figure 1:
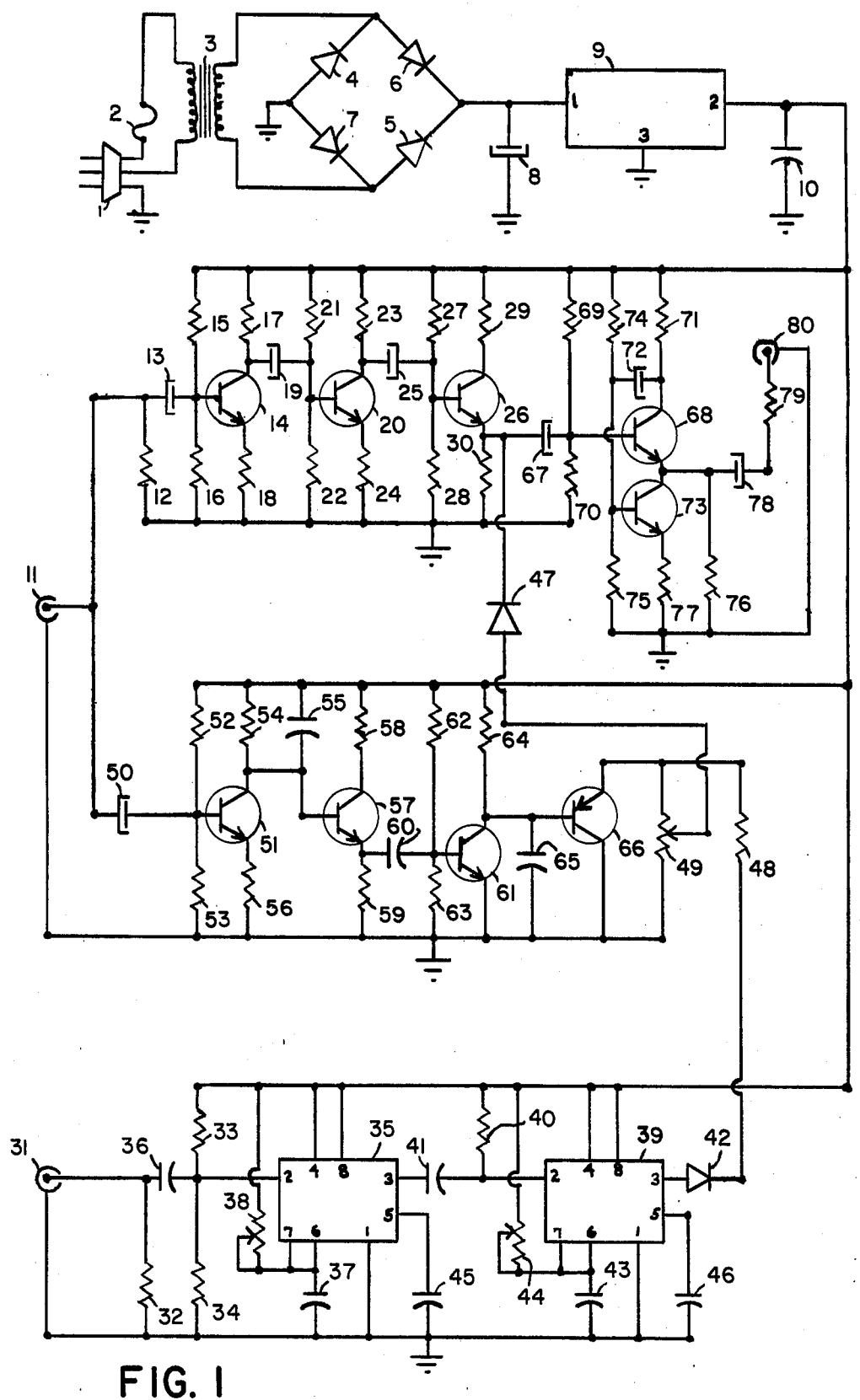
FIG. 1 is a schematic representation of the invention.

Referring to FIG. 1 of the drawings, the electronic signal processor characterizing the present invention comprises an electrical outlet cord 1 which receives standard 115 volts alternating current which passes through 1 ampere fuse 2 and is applied to the primary of transformer 3. The voltage applied to the primary is stepped down by the transformer 3 secondary. The secondary is connected to a diode bridging circuit causing unidirectional current to flow through 1N4001 diodes 4 and 5, or 1N4001 diodes 6 and 7 during each half of the alternating current cycle, charging 500 microfarad electrolytic capacitor 8 and providing direct current to MC7812 IC voltage regulator 9. The IC voltage regulator 9 provides a stable well regulated 12 volt direct current voltage to all of the stages in the invention. A 0.1 microfarad capacitor 10 connected to the IC voltage regulator 9 provides suppression of any transient voltages which may appear on the 12 volt direct current line.

Coaxial connector 11 accepts a video signal which may be terminated in optional 75 ohm resistor 12. The video signal passes through 50 microfarad coupling capacitor 13 which isolates the video signal source and the base of 2N3904 transistor 14 with regard to dc. A voltage divider consisting of 56,000 ohm resistor 15 and 12,000 ohm resistor 16 establishes the base bias voltage for transistor 14. The video input signal appearing across the base-emitter junction of transistor 14 causes the base current of transistor 14 to vary as the signal does. The resulting base current variations cause variations in the collector current of transistor 14, which are similar but greater in amplitude. The current variations then cause large amplitude voltage variations across 680 ohm load resistor 17. 470 ohm emitter resistor 18 establishes the input impedance and stage voltage gain. The video signal present at the collector of transistor 14 passes through 50 microfarad coupling capacitor 19 which isolates the collector of transistor 14 and the base of 2N3904 transistor 20 with regard to dc. A voltage divider consisting of 56,000 ohm resistor 21 and 12,000 ohm resistor 22 establishes the base bias voltage for transistor 20. The video signal appearing across the base-emitter junction of transistor 20 causes the base current of transistor 20 to vary as the signal does. The resulting base current variations cause variations in the collector current of transistor 20 which are similar but greater in amplitude. The current variations then cause large amplitude voltage variations across 820 ohm load resistor 23. 470 ohm emitter resistor 24 establishes the stage voltage gain. The video signal present at the collector of transistor 20 passes through 50 microfarad coupling capacitor 25 which isolates the collector of transistor 20 and the base of 2N3904 transistor 26 with regard to dc. A voltage divider consisting of a 39,000 ohm resistors 27 and 12,000 ohm resistor 28 establishes the base bias voltage for transistor 26. The video signal appearing across the base-emitter junction of transistor 26 causes the base current of transistor 26 to vary as the signal does. The resulting base current variations cause variations in the collector current of transistor 26 which are similar but greater in amplitude. The current variations are translated into voltage variations across 680 ohm load resistor 29. Voltage variations of equal amplitude will appear at both the emitter and collector of transistor 26 due to 680 ohm emitter resistor 30 being equal to resistor 29.

The coaxial connector 31 accepts a reference signal which may be terminated in optional 75 ohm resistor 32. A voltage divider consisting of 220,000 ohm resistor 33 and 150,000 ohm resistor 34 biases the trigger terminal (pin 2) of NE555 IC timer 35 to a voltage level of 4.8 volts. When the reference signal quickly drops to a voltage level low enough to discharge 0.001 microfarad capacitor 36 it will cause the voltage present at the trigger terminal (pin 2) of IC 35 to momentarily drop below 4 volts. This triggers IC 35, causing the output terminal (pin 3) to go to a voltage level of 12 volts and 0.1 microfarad capacitor 37 begins to charge for a period determined by 150,000 ohm potentiometer 38. When capacitor 37 charges to a voltage level of 8 volts, it is sensed by the threshold terminal (pin 6) which causes discharge terminal (pin 7) to discharge capacitor 37 and return the output terminal (pin 3) to zero volts. When the output terminal (pin 3) of IC 35 drops to zero volts, the trigger terminal (pin 2) of NE555 IC timer 39, normally held at 12 volts by 10,000 ohm resistor 40, momentarily drops below 4 volts while 150 picofarad coupling capacitor 41 discharges. This triggers IC 39 causing the output terminal (pin 3) to go to a voltage level of 12 volts, creating the periodicity indicator signal which forward biases 1N914 diode 42. 0.01 microfarad capacitor 43 begins to charge for a period determined by 150,000 ohm potentiometer 44. When capacitor 43 charges to a voltage level of 8 volts, it is sensed by the threshold terminal (pin 6) of IC 39 which causes discharge terminal (pin 7) to discharge capacitor 43 and return the output terminal (pin 3) to zero volts. 0.01 microfarad capacitor 45 connected to the control terminal (pin 5) of IC 35 and 0.01 microfarad capacitor 46 connected to the control terminal (pin 5) of IC 39, suppress any transient voltages which may appear on the control terminals.

During the interval when the periodicity indicator signal is present, the output terminal (pin 3) of IC 39 is at a voltage level of 12 volts, this causes the semiconductor junction of 1N914 diode 47 to be forward biased, raising the voltage at the emitter of transistor 26 causing a change in the biasing of the semiconductor base-emitter junction of transistor 26. This results in a change in the emitter current of transistor 26 in addition to the changes caused by the video signal. The resultant voltage variations at the emitter of transistor 26 produce a video signal with a periodicity indicator signal incorporated into it. The portion of the video signal which contains the periodicity indicator signal is an indication of the relative vertical frequency and vertical phase relationships between the video signal and the reference signal. The amplitude of the periodicity indicator signal relative to the video signal is selected by 330 ohm resistor 48 and 1,000 ohm potentiometer 49. The duration of the periodicity indicator signal is selected by potentiometer 44 and its timing relative to the reference signal is selected by potentiometer 38.

The video signal present at the coaxial connector 11 also passes through 50 microfarad coupling capacitor 50 which isolates the video signal source and the base of 2N3904 transistor 51 with regard to dc. A voltage divider consisting of 68,000 ohm resistor 52 and 12,000 ohm resistor 53 establishes the base bias voltage for transistor 51. The video signal appearing across the base-emitter junction of transistor 51 causes the base current of transistor 51 to vary as the signal does. The resulting base current variations case variations in the collector current of transistor 51 which are similar but greater in amplitude. The current variations then cause large amplitude voltage variations across 3,300 ohm load resistor 54. 39 picofarad bypass capacitor 55 prevents the high frequency component of the video signal from causing voltage variations at the collector of transistor 51. 470 ohm emitter resistor 56 establishes the input impedance and stage voltage gain. The base of 2N3904 transistor 57 is connected directly to the collector of transistor 51. The voltage variations present at the collector of transistor 51 appear across the base-emitter junction of transistor 57 causing the base current of transistor 57 to vary as the signal does. The resultant base current variations cause variations in the collector current of transistor 57 which are similar but greater in amplitude. These current variations cause voltage variations across 100 ohm collector resistor 58. These current variations also occur through 1,000 ohm resistor 59 causing voltage variations at the emitter of transistor 57. A portion of these voltage variations pass through 0.05 microfarad coupling capacitor 60 to the base of 2N3904 transistor 61. A voltage divider consisting of 220,000 ohm resistor 62 and 10,000 ohm resistor 63 bias the base of transistor 61 at a point where only the most positive of the voltage variations present at the emitter of transistor 57 will cause current variations through 8,200 ohm load resistor 64. These current variations then cause very large amplitude voltage variations across resistor 64. The signal present at the collector of transistor 61 is the amplified horizontal and vertical synchronization signals which were present in the original video signal. The synchronization signals present at the collector of transistor 61 are lengthened 5 microseconds due to the time required for 1500 picofarad capacitor 65 to charge. The base of 2N3906 transistor 66 is connected directly to the collector of transistor 61. The voltage variations present at the collector of transistor 61 cause transistor 66 to saturate during intervals when synchronization signals are present in the video signal and diode 42 is forward biased by the presence of the periodicity indicator signal at the output terminal (pin 3) of IC 39. The saturation of transistor 66 reduces the voltage appearing across potentiometer 49 causing the semiconductor junction of diode 47 to be reverse biased. This prevents the periodicity indicator signal from being incorporated into the video signal during intervals when synchronization signals are present in the video signal.

The voltage variations present at the emitter of transistor 26 pass through 50 microfarad coupling capacitor 67 which isolates the emitter of transistor 26 and the base of 2N3904 transistor 68 with regard to dc. A voltage divider consisting of 18,000 ohm resistor 69 and 22,000 ohm resistor 70 establishes the base bias voltage for transistor 68. The video signal causes variations in the bias voltage which produces large current variations in the current flowing through 150 ohm collector resistor 71. These current variations are translated into voltage across resistor 71 which are similar to the video signal. These voltage variations pass through 50 microfarad coupling capacitor 72 which isolates the collector of transistor 68 and the base of 2N3904 transistor 73 with regard to dc. A voltage divider consisting of 8,200 ohm resistor 74 and 5,600 ohm resistor 75 establishes the base bias voltage for transistor 73. The video signal appearing across the base-emitter junction of transistor 73 causes the base current to vary as the signal does. The resulting base current variations cause variations in the collector current of transistor 73 which complements the current variations occuring through transistor 68. These current variations are translated into voltage variations across 470 ohm load resistor 76. 150 ohm resistor 77 sets the voltage gain of transistor 73 at a level which is symmetrical with the voltage variations at the emitter of transistor 68.

The voltage variations present at the collector of transistor 73 pass through 500 microfarad coupling capacitor 78 which isolates the collector of transistor 73 with regard to dc. 75 ohm resistor 79 drops the voltage variations present at coaxial connector 80 to a level that causes the invention to provide an unity gain video signal to an external 75 ohm load connected to coaxial connector 80.

In operation, the video signal appearing at coaxial connector 11 passes through the video amplifier portion of the invention composed of parts 11 through 30 and parts 67 through 80. A reference signal appearing at coaxial connector 31 is applied to the input of the periodicity indicator signal generator composed of parts 31 through 46. The input of the synchronization signal detector composed of parts 50 through 66 is connected to the video amplifier by capacitor 50. Parts 47, 48 and 49 provide a means of connecting the periodicity indicator signal generator and synchronization signal detector to the video amplifier. Electrical current to the video amplifier, periodicity indicator signal generator and synchronization signal detector is provided by the power supply parts 1 through 10.

Figure 2:
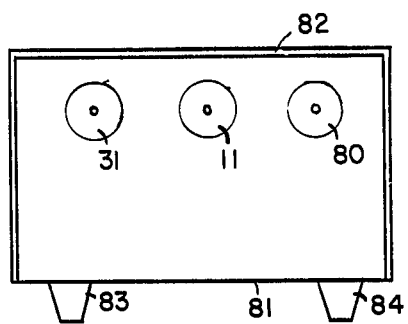
FIG. 2 is a front view of the invention.
Figure 3:
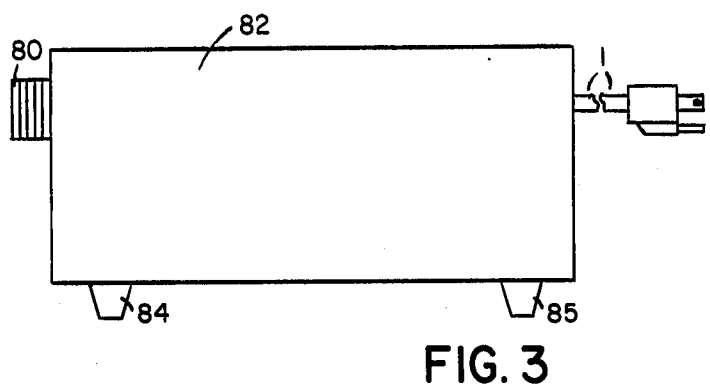
FIG. 3 is a side view of the invention.
Figure 4:
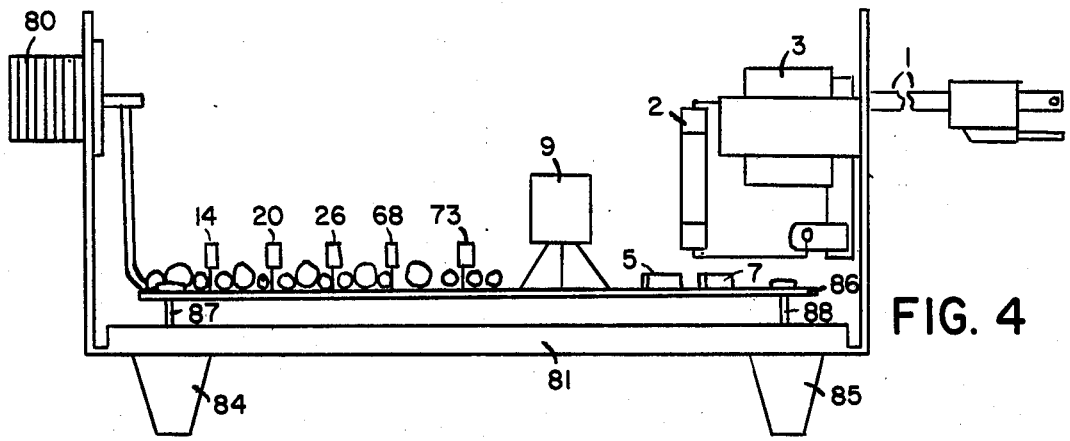
FIG. 4 is a side view of the invention with the upper enclosure removed.

The arrangement of the coaxial connectors 11, 31 and 80 on the front panel of the lower part of the enclosure 81 is shown in FIG. 2. Referring to FIG. 3, a side view of the invention is shown with the upper part of the enclosure 82 in place. The enclosure is comprised of two parts, the upper enclosure 82 and the lower enclosure 81 both constructed from a rigid, conducting material. The lower enclosure 81 rests on 4 rubber feet, three of the feet 83, 84 and 85 are depicted in FIG. 2 and FIG. 3. FIG. 4 is a side view of my invention shown with the upper enclosure removed. Electric outlet cord 1, 1 ampere fuse 2 and transformer 3 are secured to the rear apron of the lower enclosure 81. The printed circuit board 86 is secured to the lower enclosure by four mounting screws. Two of the screws 87 and 88 are also shown in FIG. 4.

Figure 5:
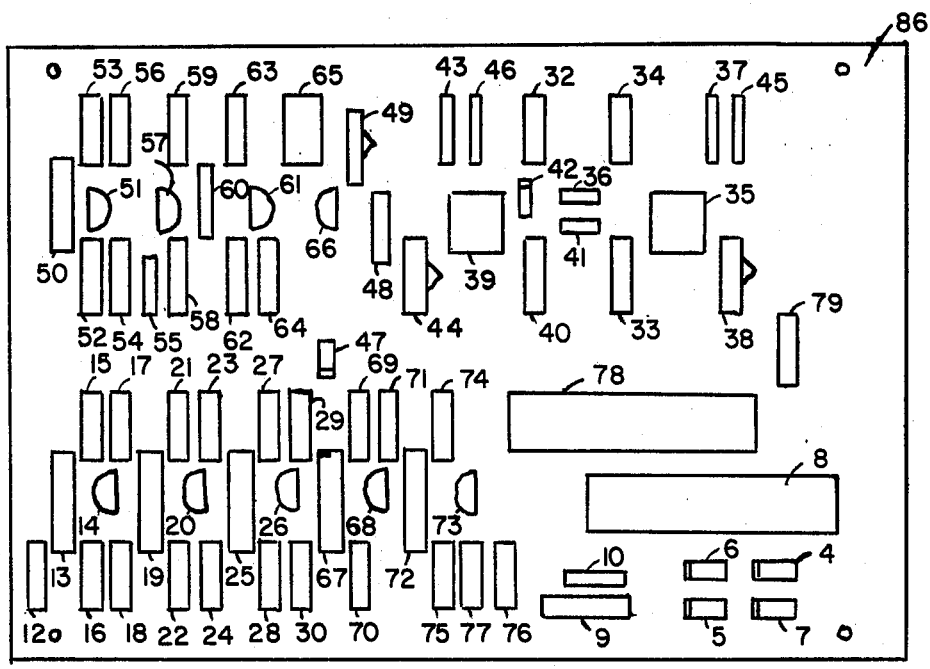
FIG. 5 is a top view of the main printed circuit board of the invention.

The printed circuit board 86 is composed of a rigid insulating material with a conductive material attached to the bottom side in such a manner to provide the necessary electrical connections between the electronic components mounted on top of the printed circuit board 86. FIG. 5 depicts the placement of the electronic components on top of the printed circuit board 86.

A side view of a modified embodiment of my invention with the upper enclosure removed is shown in FIG. 6. An additional printed circuit board 89 has been incorporated into the invention. It is mounted to the front apron of the lower enclosure 81 by two mounting screws, one of the screws 90 is shown in FIG. 6. One or more additional printed circuit boards can be mounted in this fashion. Each additional printed circuit board 89 incorporated into the invention must have an additional coaxial connector added to the front apron of the lower enclosure 81 to accept the additional reference signal. Referring to FIG. 7, the placement of the additional coaxial connector 91 is shown on the front panel. The printed circuit board 89 is constructed of a rigid, insulating material with a conductive material attached to the bottom side in such a manner to provide the neccessary electrical connections between the electronic components mounted on top of the printed circuit board. FIG. 8 shows the placement of the components on top of the printed circuit board 89. FIG. 9 is a schematic representation of the additional circuitry which generates the additional periodicity indicator signal.

Referring to FIG. 9, the coaxial connector 91 accepts a reference signal which may be terminated in optional 75 ohm resistor 92. A voltage divider consisting of 220,000 ohm resistor 93 and 150,000 ohm resistor 94 biases the trigger terminal (pin 2) of NE555 IC timer 95 to a voltage level of 4.8 volts. When the reference signal quickly drops to a voltage level low enough to discharge 0.001 microfarad capacitor 96 it will cause the voltage present at the trigger terminal (pin 2) of IC 95 to momentarily drop below 4 volts. This triggers IC 95 causing the output terminal (pin 3) to go to a voltage level of 12 volts and 0.1 microfarad capacitor 97 begins to charge for a period determined by 150,000 ohm potentiometer 98. When capacitor 97 charges to a voltage level of 8 volts, it is sensed by the threshold terminal (pin 6) which causes discharge terminal (pin 7) to discharge capacitor 97 and return the output terminal (pin 3) to zero volts. When the output terminal of IC 95 drops to zero volts, the trigger terminal (pin 2) of NE555 IC 99 normally held at 12 volts by 10,000 ohm resistor 100, momemtarily drops below 4 volts while 150 picofarad capacitor 101 discharges. This triggers IC 99 causing the output terminal (pin 3) to go to a voltage level of 12 volts creating an additional periodicity indicator signal which forward biases 1N914 diode 102. 0.01 microfarad capacitor 103 begins to charge for a period determined by 150,000 ohm potentiometer 104. When capacitor 103 charges to a voltage level of 8 volts, it is sensed by the threshold terminal (pin 6) of IC 99 which causes discharge terminal (pin 7) to discharge capacitor 103 and return the output terminal (pin 3) to zero volts. 0.01 microfarad capacitor 105 connected to the control terminal (pin 5) of IC 95 and 0.01 microfarad capacitor 106 connected to the control terminal (pin 5) of IC 99 suppresses any transient voltages which may appear on the control terminals. The cathode of output diode 102 on printed circuit board 89 is connected to the cathode of diode 42 on printed circuit board 86. (FIG. 5). The result is that when a periodicity indicator signal is present at the output terminal (pin 3) of IC 99, it will forward bias diode 102. Diode 47 will also be forward biased causing the incorporation of the additional periodicity indicator signal into the video signal, except when synchronization signals are present in the video signal.

Additional periodicity indicator signal generators, such as the one on printed circuit board 89 can be incorporated into the invention by connecting the cathodes of the output diodes to the cathode of diode 42. The additional periodicity indicator signals can be identified by adjusting potentiometer 104 for recognizably different durations.

Having thus described the invention, it is to be understood that certain modifications in the construction and arrangement of the parts thereof will be made as deemed necessary, without departing from the scope of the appended claims.

I claim:

1. An electronic signal processor, comprising the combination of a video amplifier having at the input of said video amplifier a means of accepting a video signal and at the output of said video amplifier a means of providing a video signal, means disposed in said video amplifier to incorporate a periodicity indicator signal into said video signal as said video signal passes through said video amplifier; a periodicity indicator signal generator having at the input of said periodicity indicator signal generator means of accepting a reference signal and at the output of said periodicity indicator signal generator a means of connection to said video amplifier for incorporation of said periodicity indicator signal into said video signal as said video signal passes through said video amplifier, a means included within said periodicity indicator signal generator of selecting duration and timing of said periodicity indicator signal relative to said reference signal; a synchronization signal detector connected to said video amplifier capable of determining the presence of synchronization signals within said video signals as said video signal passes through said video amplifier, means of which said synchronization signal detector prevents incorporation of said periodicity indicator signal into said video signal during intervals when said synchronization signals are present in said video signal; and a means of providing electrical current to said video amplifier, said periodicity indicator signal generator and said synchronization signal detector.

2. An electronic signal processor as defined in claim 1 having means of generating one or more additional periodicity indicator signals for incorporation into said video signal.

3. An electronic signal processor as defined in claim 1, wherein said means of providing electrical current is a power supply which accepts alternating current from an external source and converts said alternating current into direct current for use within the invention.

* * * * *